2,857,974

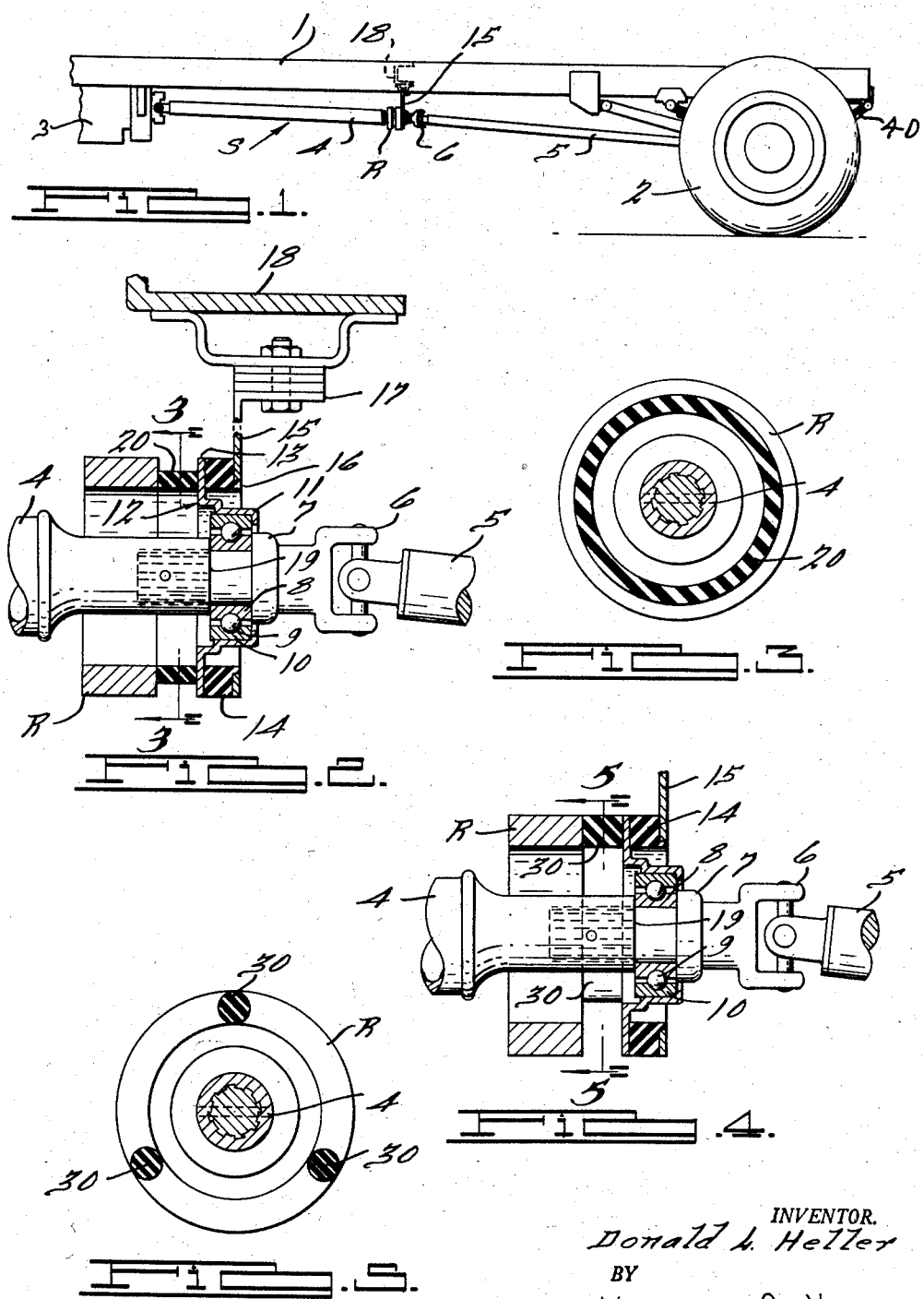

PROPELLER SHAFT VIBRATION ABSORBER

Donald L. Heller, Detroit, Mich., assignor to Chrysler Corporation, Highland Park, Mich., a corporation of Delaware Application February 16, 1956, Serial No. 565,885

9 Claims. (Cl. 180—70)

My invention relates to motor vehicles and more particularly to an improved intermediate or center bearing support for a sectional propeller shaft that will isolate and eliminate the transmission of vibrational disturbances from the propeller shaft to its shaft supporting frame member.

The use of a so-called center bearing supported, sectional, propeller shaft presents several problems because of the necessity of using a vibration isolation mounting at the center bearing. The isolation mounting has a resonant frequency which is dependent on its stiffness and on the amount of mass it supports. The resonant frequency of the mounting must be kept low (below 25 C. P. S.) in order that the sensitivity to unbalance is not beyond commercial limits.

Also, second order bending forces that are radial to the axis of rotation of the propeller shaft, due to universal joint angularity, produce forces that are transmitted to the center bearing and may be evidenced by a shudder or vibration of the center bearing. The forces causing shudder are proportional to the torque transmitted and to the angles at which the shaft connected universal joints operate, although a certain amount of cancellation can be achieved by proper phasing of the joints.

The effects of both of these vibration disturbances can be considerably lessened or substantially eliminated by the use of a dynamic vibration absorber. By proper tuning the single peak of vibration caused by the resonant system can be replaced by two peaks on either side of the original resonant frequency but of lesser amplitude.

An application of this type of vibration absorber to minimize center bearing shudder and to reduce the effect of propeller shaft unbalance at the center is shown in the accompanying drawing. An inertia weight ring R is used that is concentrically arranged about the propeller shafts to make the design compact. The weight R is attached to the center bearing support plate 15 by means of rubber isolation mountings loaded in shear. Absorbers such as those shown in the drawing have already been tried and have proven to be effective in reducing center bearing shudder and other types of vibrational disturbances.

An object of the invention is to provide a center bearing support that includes a dynamic type of vibration absorber arranged to isolate and oppose propeller shaft vibration and reduce its transmission to the shaft supporting vehicle chassis.

Additional objects and advantages of the invention will be apparent from the following specification having reference to the accompanying drawings wherein:

Fig. 1 is a side elevation of a portion of a vehicle;

Fig. 2 is an enlarged sectional view of the center bearing support;

Fig. 3 is a sectional elevational view looking in the direction of the arrows on line 3—3 of Fig. 2;

Fig. 4 is a sectional elevational view, similar to Fig. 2, showing a modified form of this invention; and Fig. 5 is a sectional elevational view taken along the line 5—5 of Fig. 4 looking in the direction of the arrows.

In the drawings the chassis frame 1 is supported at its rear through suitable springs 40 upon road wheels 2. The wheel driving axles (not shown) are connected to the vehicle power plant 3 by a sectional propeller shaft S composed of the shaft sections 4 and 5 that are connected together by a universal joint 6. Between the hub 7 of the forward yoke of the joint 6 and a shoulder 19 on the shaft 4 is clamped the inner race 8 of an aniti-friction bearing having hardened balls 9 and an outer race 10. The bearing outer race 10 is fixedly seated in a cuplike formation 11 in the center of the annular, stepped mounting plate 12. The peripheral flange portion 13 of the mounting plate 12 has a resilient mounting ring 14 bonded to one side thereof. The resilient mounting ring 14 which is preferably rubber or some similar composition, is bonded to a support plate 15. A neck portion 16 of the resilient mounting ring 14 is compressively mounted in an aperture in the support plate 15. Support plate 15 has a flange 17 thereof bolted or otherwise suitably connected to the cross-member 18 of the chassis frame 1.

The nucleus of this improved vibration absorber resides in the resiliently mounted inertia weight R. Inertia weight R is of ring-like formation so that it may be concentrically mounted about the supported propeller shaft section 4. Inertia ring R is preferably a metal element that is relatively heavy and it is connected to the resiliently supported mounting plate 12 by means of suitable resilient means 20. Resilient means 20, in the Fig. 1–2 form of this invention, comprises a rubber ring that has its opposite end portions connected to the mounting plate 12 and to the inertia ring R respectively. It has been found that by using an inertia weight R of the proper weight and a resilient support ring 20 of the proper degree of resilience in combination with the resiliently supported bearing 8—10, torsional vibrations as well as radially acting forces can be damped to such a degree that a greatly improved propeller shaft mounting is achieved. While dynamic vibration absorbers per se are known, it is thought that the use of a dynamic vibration absorber in a resiliently mounted bearing support is a novel arrangement.

Figs. 4 and 5 show a modified form of the invention shown in Figs. 1–3. In the form of the invention shown in Figs. 4 and 5 all elements of the center bearing mounting, except the resilient ring mounting tabs 30, are identical to the elements shown in Figs. 1–3. The three tabs 30 are preferably spaced equidistantly apart in a circumferential direction. It may be that a different number of mounting tabs may prove advantageous in certain installations and the tabs can be of other than circular cross-sectional configuration.

The use of rubber alone for propeller shaft mountings has been found unsatisfactory because the rubber, due to its resiliency, has a natural vibration period of its own which may cause objectionable shaft vibration or shudder at certain speeds. The use of non-resilient material as a shaft mounting is also unsatisfactory because non-resilient material has insufficient sound and vibration isolating qualities too. In the device here involved the rubber bearing mounting 14 acts as a sound absorbing and shaft centering medium yet periodic vibrations in the rubber are opposed by the resiliently mounted inertia weight R which can vibrate in such a manner that it will oppose and substantially eliminate the vibrational disturbances that would otherwise be transmitted to the chassis frame because of the use of resilient bearing mounting means.

Because this dynamic vibration absorber can effectively eliminate propeller shaft unbalance, considerably less time and care need be expended in controlling the angularity of the universal joint connected propeller shaft sections. Accordingly, this bearing mounting provides for a material cost savings in the manufacture of vehicles having angularly related propeller shaft sections.

From the foregoing description it is thought to be obvious that a simplified, inexpensive, dynamic vibration absorber has been developed for association with a shaft bearing mounting means such that the resonant frequency of the mounting may be readily controlled and kept within commercial limits and at the same time the shudder or vibration resulting from propeller shaft unbalance may be substantially eliminated.

I claim:

1. In a motor vehicle chassis having an engine driven propeller shaft including a pair of joint connected shaft sections, a support for said shaft intermediate the ends thereof comprising a chassis mounted support plate, an anti-friction bearing journaling one of said shaft sections, resilient means connecting said bearing to said support plate, and a dynamic vibration absorber connected to said bearing and operative to absorb shaft vibrations, said absorber comprising inertia weight means arranged to extend around said shaft and connected to said bearing.

2. In a motor vehicle chassis having an engine driven propeller shaft including a pair of joint connected shaft sections, a support for said shaft intermediate the ends thereof comprising a chassis mounted support plate, an anti-friction bearing journaling one of said shaft sections, compressed resilient means connecting said bearing to said support plate, and a tuned dynamic vibration absorber connected to said bearing and operative to absorb shaft vibrations, said absorber comprising inertia weight means arranged concentrically about said shaft and resiliently connected to the bearing.

3. In a motor vehicle chassis having an engine driven propeller shaft including a pair of joint connected shaft sections, a support for said shaft intermediate the ends thereof comprising a chassis mounted support plate, an anti-friction bearing journaling one of said shaft sections, resilient means connecting said bearing to said support plate, and a dynamic vibration absorber connected to said bearing and operative to absorb shaft vibrations, said absorber comprising an inertia weight ring arranged concentrically about said shaft and connected to said bearing by a ring of resilient material arranged concentrically with respect to said shaft and said bearing.

4. In a motor vehicle chassis having an engine driven propeller shaft including a pair of joint connected shaft sections, a support for said shaft intermediate the ends thereof comprising a chassis mounted support plate, an anti-friction bearing journaling one of said shaft sections, resilient means connecting said bearing to said support plate, and a tuned dynamic vibration absorber connected to said bearing and operative to absorb shaft vibrations, said absorber comprising an inertia weight ring arranged concentrically wtih respect to said shaft and connected to said bearing by a plurality of circumferentially spaced apart resilient tabs.

5. A support means for a rotatable shaft comprising a shaft journaling bearing having a non-rotatable member, resilient means connected to said non-rotatable member and adapted to be connected to a shaft support, and a dynamic vibration absorber mounted on said non-rotatable member comprising an inertia weight arranged to encircle said shaft and spaced from said non-rotatable member and connected thereto by a resilient means that permits the weight to vibrate with respect to said non-rotatable member.

6. A bearing support for a rotatable shaft comprising a shaft journaling bearing having a non-rotatable outer member, a mounting plate having a seat therein fixedly receiving said bearing outer member, resilient mounting means for said mounting plate connected between said mounting plate and a support plate and providing for limited relative movement therebetween, and a dynamic vibration absorber connected to said mounting plate adapted to absorb vibrations transmitted by the bearing member, said absorber comprising an inertia ring arranged to encircle said rotatable shaft and connected to said mounting plate by resilient means that permit it to vibrate relative to said shaft.

7. In a motor vehicle chassis having an engine driven propeller shaft including a pair of joint connected shaft sections, a support for said shaft intermediate the ends thereof comprising a chassis mounted support plate, an anti-friction bearing journaling one of said shaft sections, resilient means connecting said bearing to said support plate, and a dynamic vibration absorber connected to said bearing and operative to absorb shaft vibrations, said vibration absorber comprising an inertia weight of annular shape surrounding said shaft and arranged in spaced relation to said mounting plate and connected thereto by resilient means that provide for limited relative movement between the inertia weight and the mounting plate.

8. In a motor vehicle including a chassis frame having a cross-member intermediate the ends thereof, a propeller shaft extending longitudinally of the frame having a plurality of universal joint connections therealong, a bearing journaling said shaft at a point adjacent one of said universal joint connections, and a support for said bearing comprising a support plate fixedly mounted on said frame cross-member, a mounting plate having a seat therein fixedly receiving said bearing, elastically deformable means interconnecting said mounting plate and said support plate and providing for limited relative movement therebetween, and a dynamic vibration absorber connected to said mounting plate comprising an inertia weight of annular shape extending concentrically about and spaced from said shaft and elastically deformable means connecting said inertia weight to said mounting plate and providing for limited relative movement therebetween.

9. In a motor vehicle including a chassis frame having a cross-member intermediate the ends thereof, a propeller shaft extending longitudinally of the frame having a plurality of universal joint connections therealong, a bearing journaling said shaft at a point adjacent one of said universal joint connections, and a support for said bearing comprising a support plate fixedly mounted on said frame cross-member, a mounting plate having a depressed center portion providing a seat fixedly receiving said bearing and a peripheral flange portion connected by resilient means to said support plate to provide for limited relative movement between the mounting plate and support plate, and a tuned dynamic vibration absorber connected to said mounting plate flange portion comprising an annular inertia weight arranged to surround said shaft in spaced relation thereto and resilient means arranged concentrically about said shaft connecting said inertia weight to the flange on said mounting plate and providing for limited relative movement between said inertia weight and said mounting plate.

References Cited in the file of this patent

UNITED STATES PATENTS

| | | |
|---|---|---|
| 2,195,647 | Guy | Apr. 2, 1940 |
| 2,707,032 | Burton | Apr. 26, 1955 |
| 2,746,768 | Bowser | May 22, 1956 |